F. BRAMER.
WHEEL-HARROW.

No. 185,209. Patented Dec. 12, 1876.

Witnesses:
Inventor:
Frank Bramer
by A. M. Smith
Attorney.

UNITED STATES PATENT OFFICE.

FRANK BRAMER, OF LITTLE FALLS, NEW YORK.

IMPROVEMENT IN WHEEL-HARROWS.

Specification forming part of Letters Patent No. 185,209, dated December 12, 1876; application filed June 14, 1876.

*To all whom it may concern:*

Be it known that I, FRANK BRAMER, of Little Falls, county of Herkimer, State of New York, have invented certain new and useful Improvements in Wheel-Harrows, of which the following is a full, clear, and exact description, reference being had to the accompanying drawings, making part of this specification, in which—

Figure 1:
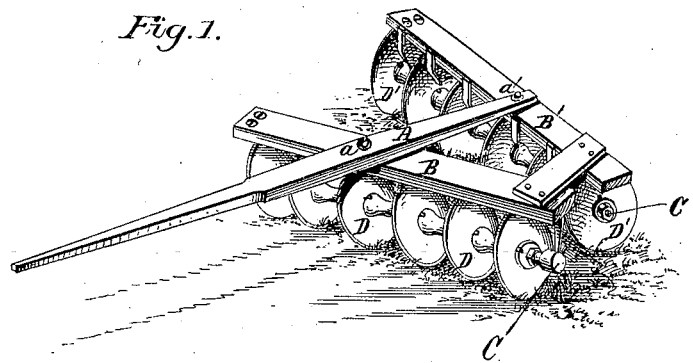
Figure 2:
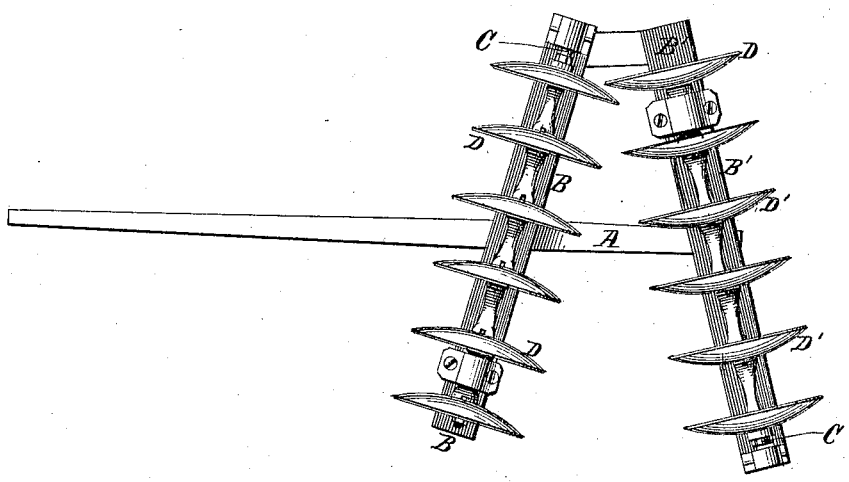

Figure 1 is a perspective view of my improved harrow, and Fig. 2 is a bottom view of the same.

Similar letters of reference denote corresponding parts in both figures.

My invention relates to a novel arrangement of the gangs of disks or wheels, whereby the efficiency of their action on the ground is greatly increased; and it consists in placing the gangs of reversely-dished, and, consequently, reversely-acting, disks or wheels one directly in rear of the other, in the same longitudinal plane, in such manner that the earth acted upon and moved laterally in one direction by the disks of the forward gang is moved in the opposite direction by the rear or following gang, as hereinafter described.

In the drawing, A represents the rear extension of the pole or pole-frame, to which the gang planks or frames B B' are attached.

These gang-planks are represented as being connected with the pole or frame A at or near midway of their length and one in rear of the other by vertical pins or pivots $a$ $a'$, which permit their angles of relation to each other, and to the pole-frame to be adjusted, as desired.

To these planks or frames B B the wheel gang-shafts C are connected by pendent bearings in the usual manner, the disks or wheels D of the forward gang being dished and facing in the reverse direction to those of the rear gang D', as shown, for the purpose of causing them to move or throw the earth laterally in opposite directions. Thus arranged, the gangs may be set obliquely to the pole-frame, and at, or nearly at, opposite angles, as shown, in such manner as that the lateral thrust of one gang upon the pole-frame shall be compensated for, or nearly so, by the reverse thrust of the following gang.

Any usual or preferred devices may be employed for setting or holding the gang planks or frames at the desired angle of adjustment.

Sometimes, instead of connecting the gang-planks to the pole or pole-frame midway of their length, as shown, it may be found desirable to hinge them thereto by their ends, and to employ a second pair having a reverse relation to each other on the other side of the tongue or tongue-frame to counterbalance the first-named pair and prevent side draft.

Other modifications in arrangement will suggest themselves to the skilled mechanic in carrying out my invention, the object of which, as above stated, is to bring the reversely-acting gangs into the same longitudinal plane, and thereby to increase its efficiency in thoroughly stirring up and lightening the soil preparatory to its reception of the seed. Thus, the gang-bars may be placed parallel with each other, either at right angles or obliquely to the pole-frame, as desired, and the wheels or disks may either be connected rigidly with the shaft or they may be supported independently, and placed at different angles, as preferred.

In the construction of wheel-harrows it has been the practice heretofore to place the gangs opposite each other, or thereabout, and the disks or wheels of both gangs were dished on their inner faces; consequently, both gangs threw the soil inward, forming a ridge in the center, and leaving the ground uneven and in ridges.

With my arrangement this difficulty is entirely obviated, as the earth, thrown inward by the forward gang or gangs, will be thrown in a reverse direction by the rear gang, and, while it is additionally stirred thereby, is practically replaced and leveled by the action of such rear gang.

Parts of the machine not particularly described may be constructed and arranged in any usual or preferred way.

Having now described my invention, what I claim as new, and desire to secure by Letters Patent, is—

In a wheel-harrow, the reversely-acting wheel-gangs arranged one in rear of the other, and in the same, or nearly the same, longitudinal plane, substantially as and for the purpose described.

FRANK BRAMER.

Witnesses:
 GERRET DRAKE,
 A. L. BURT.